United States Patent [19]

Maruyama et al.

[11] Patent Number: 4,935,085
[45] Date of Patent: Jun. 19, 1990

[54] PROCESS FOR PRODUCING URETHANE DIE

[75] Inventors: Yoshikuni Maruyama; Hiroshi Itoh; Kesao Taguchi; Terumi Nagao; Toshiki Takeda, all of Sayama, Japan

[73] Assignee: Honda Giken Kogyo Kabushiki Kaisha, Tokyo, Japan

[21] Appl. No.: 420,602

[22] Filed: Oct. 4, 1989

Related U.S. Application Data

[63] Continuation of Ser. No. 135,180, Dec. 18, 1987, abandoned.

[30] Foreign Application Priority Data

Dec. 19, 1986 [JP] Japan ............... 61-301564
Dec. 22, 1986 [JP] Japan ............... 61-303773

[51] Int. Cl.⁵ .................................. B29C 45/16
[52] U.S. Cl. .................................. 156/245; 156/330; 156/330.9; 156/331.7; 264/46.4; 264/46.7; 264/328.1; 249/114.1; 249/115
[58] Field of Search .......... 156/77, 78, 79, 242, 156/245, 330, 330.9, 331.7, 500; 264/46.4, 46.7, 328.1; 249/105, 114.1, 115; 72/465, 476

[56] References Cited

U.S. PATENT DOCUMENTS 3,101,065  8/1963  Kalis ...................... 72/465
3,615,071 10/1971  Harper ................... 249/114
3,956,451  5/1976  Adams ................... 264/45.5
4,111,024  9/1978  Dahlman et al. ........ 72/60
4,542,070  9/1985  Ohtani et al. ........... 156/331.7

FOREIGN PATENT DOCUMENTS 59-11370   3/1984  Japan .
61-176424  8/1986  Japan .
61-176426  8/1986  Japan .
366914     3/1973  U.S.S.R. ............... 249/115
1024382    3/1966  United Kingdom .
1316191    5/1973  United Kingdom ....... 72/465

Primary Examiner—Caleb Weston
Attorney, Agent, or Firm—Armstrong, Nikaido, Marmelstein, Kubovcik & Murray

[57] ABSTRACT

A process for producing a urethane die. A heat-resistant epoxy adhesive is applied to the inner surface of a recess provided in the body of a die. A urethane primer is applied to the adhesive while the adhesive is still in a semi-hardened state. A punch is inserted into the recess to form a space between the recess and the punch and a urethane resin is injected into the space to form a resin layer on the recess having a shape corresponding to the outer surface of the punch. A reinforcing fibrous material may be incorporated into the resin layer by applying a urethane resin having a lubricant incorporated therein to the surface of the punch and adhering a fibrous material impregnated with the urethane resin to the coated surface of the punch prior to inserting the punch into the recess.

4 Claims, 2 Drawing Sheets

PROCESS FOR PRODUCING URETHANE DIEd

This application is a continuation of application Ser. No. 135,180, filed Dec. 18, 1987, now abandoned.

BACKGROUND OF THE INVENTION

1. Field of the Invention

The present invention relates to a process for producing a urethane die for use in pressing and, more specifically, to a process for producing a urethane die having a resin layer made of a urethane resin and which corresponds to the shape of a punch which is inserted into the recess of the die.

2. Description of the Prior Art

Japanese Patent Application Laid-Open No. 176,426/1986 discloses a process for producing a die comprising inserting a punch into a recess formed in the body of a die so that a space is formed between the recess and the punch, and injecting a urethane resin into the space formed in the recess so that a resin layer in the shape of the punch is formed in the recess.

In the above-mentioned die, ribs are provided protrusively in the recess for the purpose of improving the bite, or adherence, between the die body and the urethane resin layer. However, the resin layer sometimes peels off from the die body in the case of repeated use. It may be possible to cope with this difficulty by preliminarily applying an adhesive to the inner surface of the recess to thereby bond the resin layer to the die body. In this case, however, the adhesive often degenerates to lower the bonding strength thereof because it is affected by heat generated during the hardening of the urethane resin. Additionally, because a urethane resin is sometimes subjected to a hardening treatment in a drying furnace or the like to promote the hardening thereof, there also occurs a problem of degeneration of the adhesive.

SUMMARY OF THE INVENTION

To solve the above-mentioned problems, the present invention provides a process for producing a urethane die comprising inserting a punch into a recess formed in the body of a die such that a space is formed between the recess and the punch, and injecting a urethane resin into the space so as to form in the recess a resin layer having a shape corresponding to the punch, and which is characterized in that, in a step preceding the insertion of the punch, a heat-resistant epoxy adhesive is applied to the inner surface of the recess and then a urethane primer is applied to the adhesive while the adhesive is still in a semi-hardened state.

DETAILED DESCRIPTION

The use of a heat-resistant epoxy adhesive prevents the adhesive from being degenerated, or its adhesive properties deteriorated, by heat generated during the hardening of the urethane resin or by heating in a drying furnace or the like. Although the affinity of a urethane resin for an epoxy resin is poor, the adhesion of the urethane resin layer to the epoxy adhesive is enhanced by applying a urethane primer to the epoxy adhesive which is in a semi-hardened state and effecting the hardening while reacting the epoxy adhesive with the urethane primer. The use of the primer, which has an affinity for the epoxy adhesive, coupled with the above-mentioned prevention of thermal degeneration of the adhesive, enables the urethane resin layer to be firmly bonded to the body of a die.

Suitable urethane resins include those known in the art for producing a urethane die. Suitable heat-resistant epoxy resins can be readily determined by persons of ordinary skill in the art. The epoxy resin, for use as an adhesive, is typically mixed with a curing agent before being applied to the recess.

Description of Preferred Embodiments

Figure 1:
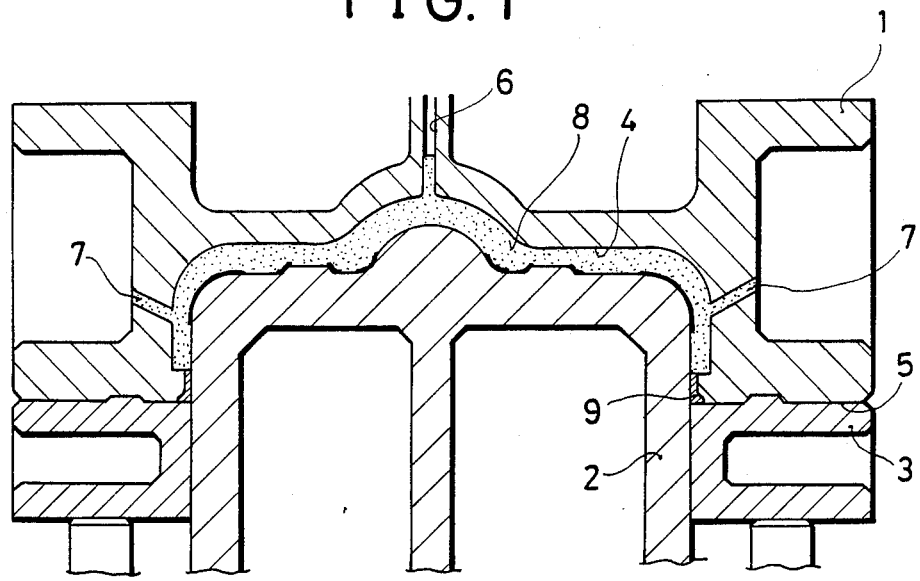
FIG. 1 is a cross sectional side view of a state of injection of a urethane resin into a die.

Referring to FIG. 1, numeral 1 refers to the body of a die, numeral 2 to a punch, and numeral 3 to a blank holder, all of which are made of a metal such as an FC (cast iron) material. The die body 1 is provided with a recess 4 in the middle of a lower surface thereof, which is formed somewhat larger than the punch 2 so that a space is formed between the recess and the punch when the punch is inserted into the recess, and with a die face 5 confronting the blank holder 3. The punch 2 is inserted into the recess 4 and the die body 1, the punch 2 and the blank holder 3 are set in a shut-height state as shown in FIG. 1. A urethane resin 8 is injected into the recess 4 through injection ports 7 formed in the circumferential wall portion of the die body 1 to fill the resin 8 in the space in the recess, while at the same time air in the recess 4 is removed through an air vent 6 formed in the upper wall portion of the die body 1. Numeral 9 in the figure refers to sealing sheet wax stuck to the inner circumference of an opening of the recess 4. The urethane resin used is Ureol 6414A manufactured by Ciba-Geigy. Ureol 6414A has the following physical properties:

| (Cure at 40° C. for 14 hours) | |
| --- | --- |
| Density | Approx. 1 g/cm$^3$ |
| Shore D hardness, ISO868 | 65–70 |
| Tension strength, ISO527 | 40–50 N/mm$^2$ |
| Wear proof property, (S33)NEMA | 10–12 mg/100 U |

Figure 2:
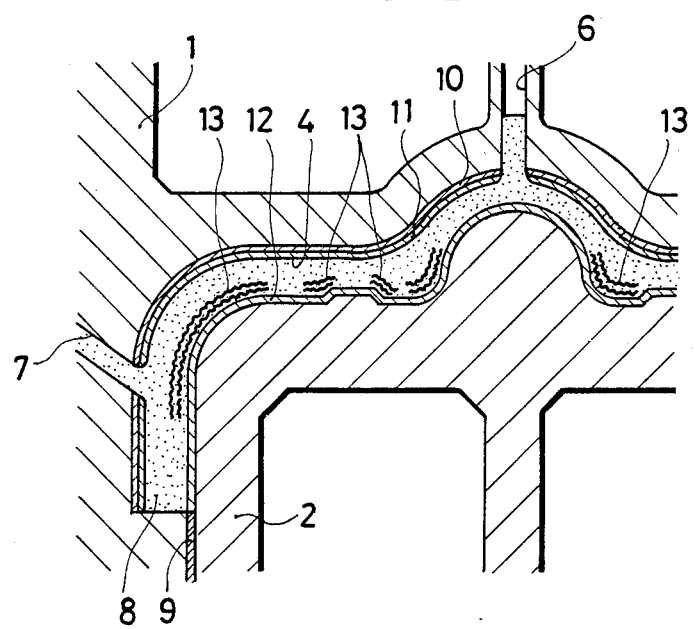
FIG. 2 is an enlarged cross sectional side view of the main portion of the die of FIG. 1.

In the step preceding the insertion of the punch 2 into the recess 4, a heat-resistant epoxy adhesive 10 is applied to the inner surface of the recess 4 and a urethane primer 11 is applied to the epoxy adhesive while the adhesive is still in a semi-hardened state as shown in FIG. 2. AW 106 and AV 138 adhesives manufactured by Ciba-Geigy (Japan) are suitable for use as the adhesive 10, while Adapt Primer manufactured by Kokusai Chemical K.K. for urethane rubber and containing bisphenol A type epoxy resin as its main ingredient is suitable as the urethane primer 11.

For use as an adhesive in the present invention, AW 106 is mixed with HV 953U, a curing agent manufactured also by CIBA-GEIGY and AV 138 with HV 998, another curing agent manufactured by CIBA-GEIGY.

The thermal characteristics of these adhesives are as shown in the tables below:

| CURING TEMPERATURE | CURING TIME | SHEARING STRENGTH (kg/mm$^2$) |
| --- | --- | --- |
| AW 106/HV 953U | | |
| 23° C. | 1 day | 1.5–1.7 |
| 40° C. | 16 hours | 1.6–1.8 |
| 80° C. | 15 minutes | 1.9–2.1 |
| 100° C. | 10 minutes | 2.0–2.1 |
| AV 138/HV 998 | | |
| 25° C. | 1 day | 1.4–1.6 |
| 40° C. | 15 hours | 1.7–1.9 |
| 70° C. | 2 hours | 2.3–2.6 |
| 100° C. | 20 minutes | 2.6–2.9 |
| 150° C. | 10 minutes | 2.9–3.2 |

The following tests were made to show the improved adhesion provided by the use of the urethane primer in the present invention:

A urethane resin (Ureol 6414A) was injected between two steel-made columnar bodies (each measuring 30 mm in diameter) to connect them to each other and was then left until cured. A tension test was conducted on each of the test pieces. It was determined that the tension strength therebetween was 145 kg when no adhesive was applied to the columnar bodies, 259 kg when the urethane resin was injected therebetween 10 minutes after the adhesive AV 138/HV 998 was applied to the columnar bodies, and 356 kg when the urethane resin was injected therebetween following application of the ADAPT Primer 10 minutes after the same adhesive was applied to the columnar bodies. The strength was 318 kg when the urethane resin was injected therebetween 10 minutes after the adhesive AW 106/HV 953U was applied to the columnar bodies, and 544 kg when the urethane resin was injected therebetween following application of the ADAPT Primer 10 minutes after the same adhesive was applied. The strength was 402 kg when the ADAPT Primer was applied 50 minutes after the adhesive was applied.

Although a heat of about 50° C. is generated during the hardening of the urethane resin 8, the above-mentioned adhesive is not adversely affected thereby because it can remain free of deterioration even if heated at about 100° C. for a long period of time. This property, coupled with the improvement made in the adhesion of the adhesive to the urethane resin 8 thanks to the primer 11, provides a sufficient bonding strength between the hardened resin layer and the die body 1. It was confirmed that no peeling of the resin layer occurred even if press molding was conducted 100,000 times at a rate of 40 times/min under a press load of 1 kg/mm$^2$.

The bent portion and the drawn portion of a press molding where the molding load is high cannot be molded with a high precision unless the compressive strength of the resin layer is high. Thus, it is sometimes necessary to increase the compressive strength of the resin layer over that provided by the urethane resin alone. Further, it is desired that the slippage of the resin layer relative to a blank be improved to improve durability. In view of this, in the step preceding the insertion of the punch 2, another urethane resin 12 which is of the same kind as that described above as the urethane resin 8, but additionally containing a silicone lubricant, was applied to the punch 2 (following application of a release agent to the punch), and reinforcing fiber pieces 13 impregnated with the abovementioned urethane resin 8 were stuck to shoulder portions and rising corner portions of protrusions on the upper surface of the punch 2.

The above-mentioned injection of the urethane resin 8 into the recess 4 carried out thereafter served to integrate the urethane resin 12 and the reinforcing fiber pieces 13 with the urethane resin 8 as shown in FIG. 2. Upon hardening of this composition, there was formed in the recess 4 of the die body 1 a resin layer containing the lubricant in the surface layer thereof and partially having composite reinforcing layers composed of the reinforcing fiber pieces 13 and the urethane resin 8.

A suitable example of the above-mentioned silicone lubricant is DKQ 8-778 manufactured by Dow Corning.

Figure 3:
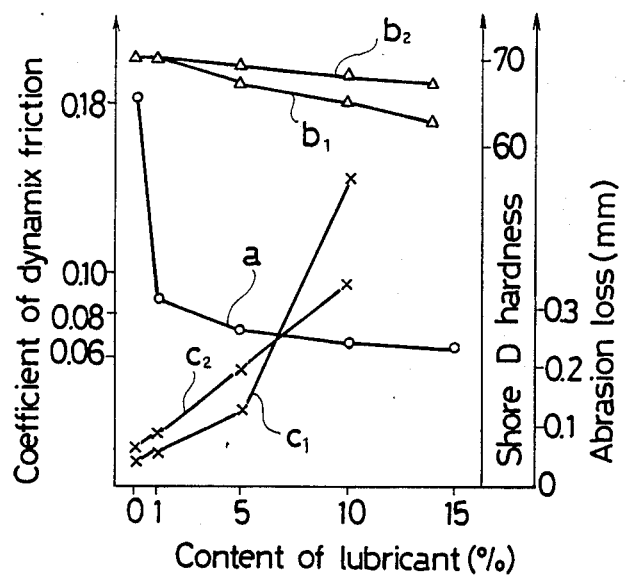
FIG. 3 is a diagram showing the relationship between the content of a lubricant incorporated into and the coefficient of dynamic friction, hardness, and abrasion loss of a resin layer.

FIG. 3 shows a relationship between the coefficient of dynamic friction, hardness (Shore D hardness according to ISO 868) and abrasion loss (after 100,000 shots) of the surface of the resin layer and the content of the lubricant incorporated into the urethane resin 12. As shown by line a in FIG. 3, the coefficient of dynamic friction was 0.18 when no lubricant was incorporated, and greatly decreased to 0.087 when 1 wt.% of the lubricant was incorporated and to 0.075 and 0.068 when 5 wt.% and 10 wt.%, respectively, of the lubricant were incorporated. The decrease became insignificant with any amount of the incorporated lubricant larger than 10 wt.%. With an increase in the amount of the lubricant, the hardness decreased as shown by line $b_1$ in FIG. 3 and the abrasion loss increased as shown by line $c_1$ in FIG. 3. Thus, the amount of the lubricant incorporated into the urethane resin 12 is desirably 1 to 5 wt.% for obtaining the desired abrasion resistance. Lines $b_1$ and $c_1$ in FIG. 3 show the hardness and the abrasion loss, respectively, of portions having no reinforcing fiber piece 13, while lines $b_2$ and $c_2$ show the hardness and the abrasion loss, respectively, of portions having a reinforcing fiber piece 13.

Fibers useful for reinforcing fiber pieces 9 include carbon fiber, glass fiber, and steel fiber. The carbon fiber has a high strength but a poor conformability to the shape of the punch. The glass fiber and the steel fiber are difficult to handle. Thus, it is desirable to use an aramid fiber, i.e., an aromatic polyamide fiber, such as Kevlar; (registered trade mark of Du Pont) which has a high strength conforms easily to the shape of the punch and is easily handled.

A plurality of reinforcing fiber pieces may be adequately laminated in accordance with the required compressive strength of each portion. The thickness of the reinforcing fiber layer is typically from 1 to 2 mm.

Figure 4:
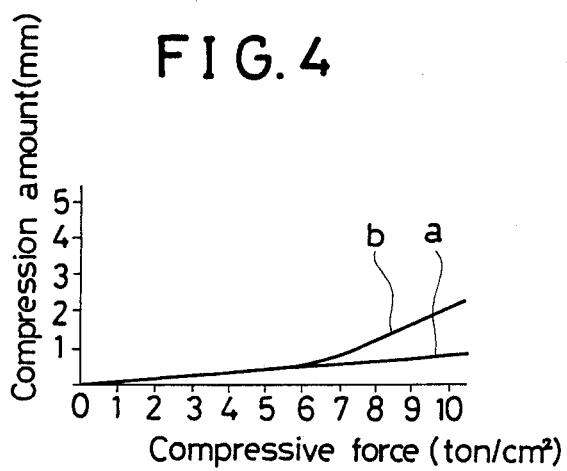
FIG. 4 is a diagram showing compressive strains of resin layers.

FIG. 4 shows compressive strains of the resin layer (thickness: 15 mm) and includes line a in the case of the resin layer having a composite reinforcing layer of the reinforcing fiber piece 13 (thickness: 2 mm) and line b in the case of the resin layer having no composite reinforcing layer. It can be understood that the composite reinforcing layer improves the compressive strength. The thickness of the resin layer will vary according to the shape of the molded product and/or its rigidity. The thickness is generally within the range of 2 to 30 mm. The rigidity will be too great if the thickness is less than about 2 mm and too low if the thickness is more than about 30 mm.

When the compressive strengths of the resin layer corresponding to the above-mentioned shoulder portions and the rising corner portions of the protrusions are low, the resin layer is largely deformed by compression due to the molding load upon press molding of a blank, so that the blank is brought into contact with neither the shoulder portions nor the corner portions, thus leading to poor accuracy of the shape. In contrast, according to the above-mentioned Example, such a disadvantage does not occur since these portions have a high compressive strength due to reinforcement by a composite reinforcing layer.

We claim:

1. A process for producing a urethane die, comprising:

providing a recess in the body of a die, applying a heat-resistance epoxy adhesive to the surface of said recess, applying to the adhesive a urethane primer, containing a bisphenol epoxy resin as its main ingredient, and having an affinity to the adhesive while the adhesive is in a semi-hardened state, inserting a punch into the recess so as to form a space between the recess and the punch, and injecting a urethane resin into said space to form a resin layer having the shape of said punch.

2. A process for producing a urethane die as recited in claim 1 wherein, prior to inserting the punch into the recess, a urethane resin containing a silicone lubricant is applied to the punch and a reinforcing fibrous material impregnated with a urethane resin is applied to those portions of the urethane coated punch which correspond to portions in said resin layer requiring a high compressive strength.

3. A process for producing a urethane die as recited in claim 2, wherein the content of the silicone lubricant incorporated into the urethane resin applied to the punch is 1 to 5 wt.%.

4. A process for producing a urethane die as recited in claim 2, wherein said reinforcing fibrous material is made of an aramid fiber.

* * * * *